No. 607,018. Patented July 12, 1898.
T. CONNELLY.
UNDERGROUND ELECTRIC CONDUIT.
(Application filed Nov. 12, 1897.)
(No Model.)
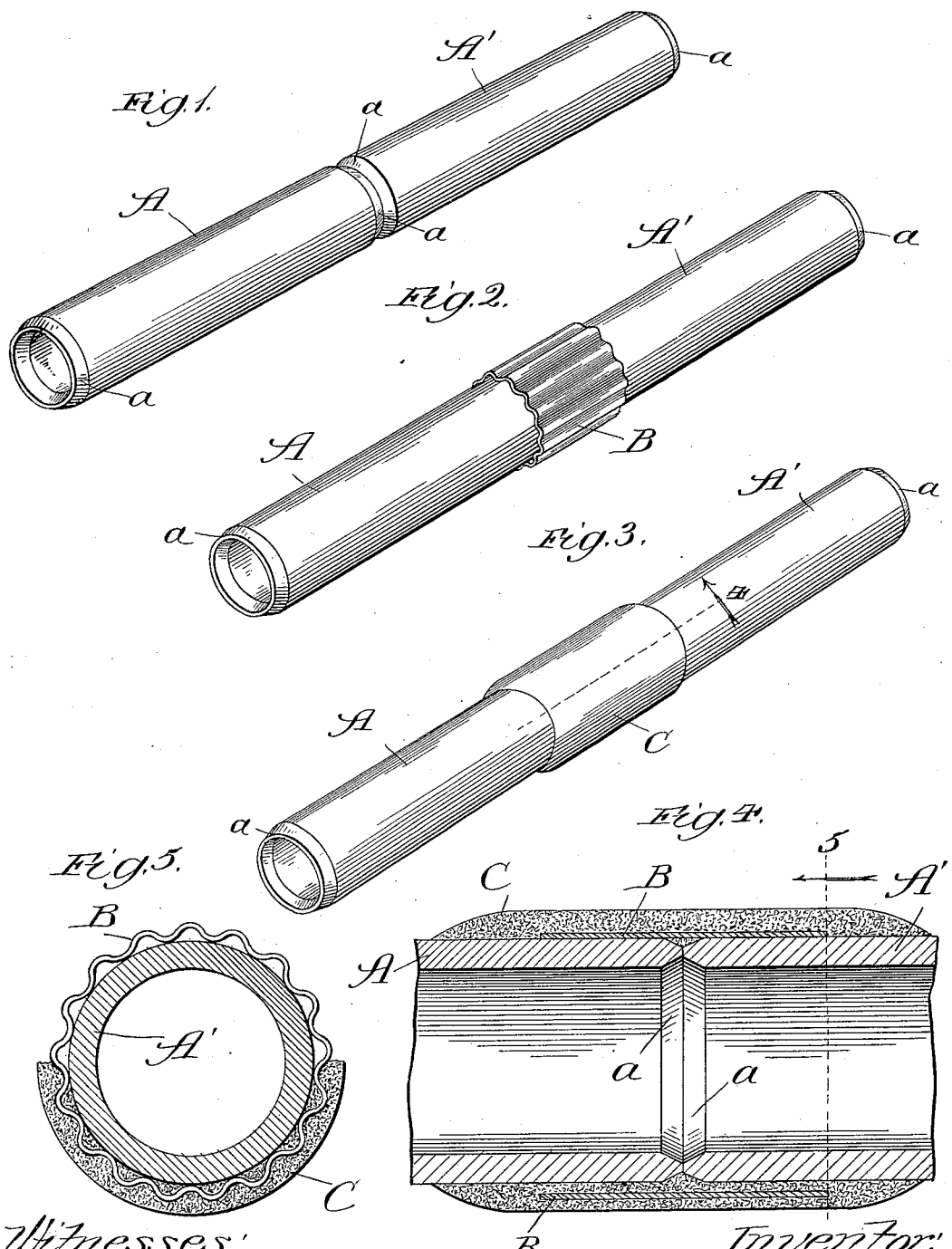

UNITED STATES PATENT OFFICE.

THOMAS CONNELLY, OF CHICAGO, ILLINOIS.

UNDERGROUND ELECTRIC CONDUIT.

SPECIFICATION forming part of Letters Patent No. 607,018, dated July 12, 1898.

Application filed November 12, 1897. Serial No. 658,290. (No model.)

*To all whom it may concern:*

Be it known that I, THOMAS CONNELLY, a citizen of the United States, residing at Chicago, in the county of Cook and State of Illinois, have invented a new and useful Electric Underground Conduit, of which the following is a specification.

My invention relates to that class of conduits which are designed to be placed underground to contain insulated electric wires.

The object of an electric conduit, broadly stated, is to provide a means by which properly-insulated electric wires may be mechanically protected when placed under the surface, usually along the line of the streets, and into which the wires may be conveniently drawn after the conduits have been placed in position and from which the wires may also be withdrawn whenever occasion requires.

When conduit tubes or ducts are not constructed in a practically straight line, as when the various sections of which they are composed do not properly register, occasioned by default of joints, improper joints, or displacement after being laid, it renders the ducts defective for the purpose of rodding. It also very materially increases the mechanical resistance when drawing the cables in, and, furthermore, the cables are frequently injured by these defects.

It is the purpose of my invention to provide means whereby the tubes or pipes composing the conduit-ducts may be substantially joined together, so that they will register in a manner to procure a smooth even hole throughout the entire length of duct. To this end I use a cylindrical pipe, preferably of tile, similar to a drain-tile, without the usual enlarged end which forms the socket. In my conduit these cylindrical pipes are each about two feet in length, of any desired size, but usually three inches internal diameter, and are joined together at the ends by means of an expansible coupling or ring. This ring is made expansible, so as to compensate for the slight variation in the outside diameter of the pipes. This variation in diameter is a result of the difference in the temperature to which the pipes are subjected during the process of burning. As it is desirable that this ring or coupling shall fit the pipes closely and hold them firmly in line and as the pipes are not of a uniform diameter, as before stated, I make the ring or coupling of a slightly-yielding nature with reference to its diameter, so that the ring or coupling will come into immediate contact with both pipes over which it is placed. This may be accomplished in a very convenient manner by making the coupling of sheet metal slightly corrugated with reference to its circumference. The corrugations thus formed will render the coupling sufficiently elastic to meet the variations in the pipe to which I have referred and at the same time add to the strength of the coupling. These couplings occupy very small space with reference to their diameter, and for this reason are very advantageous as a means of economizing space when laying a conduit of more than one duct, and for a further reason that as the tubes may be placed closely together a relatively small quantity of cement or concrete will be needed when they are laid in such material, which is the usual practice.

I will describe the preferred form of my invention in detail by referring to the accompanying drawings, in which—

Figure 1 is a perspective view of two sections A A' of my conduit tubes or pipe laid end to end, the said tubes being chamfered or beveled off at the edges of the ends on the inside and outside, as shown at *a*. Fig. 2 is a perspective view of the said tubes joined together by means of the expansive coupling or ring B; Fig. 3, a similar view showing the coupling covered with cement C or like material. Fig. 4 is a sectional view of Fig. 3 through line 4. Fig. 5 is a cross-section of the joint C through line 5 of Fig. 4 with the cement around the lower half thereof.

Similar letters refer to similar parts throughout the several views.

A and A' are two pipes laid end to end in the manner pursued in the construction of a conduit. The coupling B, being flexible in its nature, fits both pipes A and A' tightly, although there may be some difference in their respective outside diameters. By this means the pipes are held firmly and strictly in line, so that the holes through the respective pipes will also come strictly in line.

In order that the pipes may not become filled up with mud or the like, which may seep into them through the openings left by the corrugations of the coupling, I prefer to cover the coupling entirely with cement, as shown at C, Figs. 3 and 4. This will serve to keep water, mud, and the like out of the pipe, and it will also add great strength thereto after the cement has become firmly set, and it will preserve the metal ring or coupling from the effects of rust or corrosion.

When two or more ducts are laid in concrete, which is the usual practice, the cement seal will not be absolutely necessary, as the concrete will form the seal, although the cement will produce a more substantial construction, and I prefer to seal the joints in this way.

What I claim, and desire to secure by Letters Patent, is—

1. A conduit composed of a series of tubes laid coaxially, said tubes being chamfered on their ends, and an unbroken, corrugated, metallic ring over the joints, for holding the said tubes in line, substantially as shown and described.

2. A conduit-duct composed of a series of tubes laid coaxially, said tubes being chamfered on their ends; an unbroken metallic ring, made expansible by having corrugations impressed therein, over the joints, for holding the said tubes in line, and a seal of cement or like material, around the said ring, substantially as shown and described.

3. In a conduit-duct, the combination of the chamfered tubes A and A', the corrugated ring B, and the seal C, substantially as shown and described.

In witness whereof I hereunto subscribe my name this 8th day of November, A. D. 1897.

THOMAS CONNELLY.

Witnesses:
 FRANK J. GUDEE,
 M. F. ALLEN.